Patented Aug. 16, 1932

1,871,670

UNITED STATES PATENT OFFICE

CAMILLE DREYFUS, OF NEW YORK, N. Y., AND GEORGE SCHNEIDER, OF EAST ORANGE, NEW JERSEY, ASSIGNORS TO CELANESE CORPORATION OF AMERICA, A CORPORATION OF DELAWARE

METHOD OF UNITING ARTICLES AND PRODUCT THEREOF

No Drawing. Application filed February 13, 1928. Serial No. 254,156.

This invention relates to the method of uniting articles by means of plastic compositions containing organic derivatives of cellulose.

An object of our invention is to unite articles or sheets by means of plastic compositions in a novel manner whereby economies in time and materials are effected, and a union of great strength is obtained.

Another object of our invention is to use organic derivatives of cellulose as a binding agent for articles or sheets without the use of volatile solvents. Other objects of our invention will appear from the following detailed description.

In accordance with our invention, articles or sheets of various natures may be united by the application of a layer of an intimate mixture of finely divided organic derivatives of cellulose and plastifiers or softeners, with or without fillers, dyes, pigments and/or effect material in such quantities as to produce a joint of any desired thickness. The articles or sheets with the layer of this powder are then pressed at elevated temperature to cause coalescence of the powder to form an adherent union between the articles or sheets. The intimate mixture of finely divided organic derivatives of cellulose and plastifiers and softeners, high boiling solvents, camphor substitutes or gelatinizers used in this invention may be made in any suitable manner. However, we prefer to use the methods disclosed in our prior application Serial No. 157,868 filed Dec. 29, 1926, of which this application is in part a continuation.

In accordance with the prior application it has been found that with cellulose esters in the proper degree of subdivision and with the proper method of intimate mixing, the plastifiers, softeners and effect materials, may be directly added to the finely ground cellulose ester, without the addition of a volatile solvent for either the ester or the plastifier, softener, etc. Volatile solvents are those solvents which have low boiling points and which, in the manufacture of plastic masses by ordinary methods, are retained to a considerable extent in the masses, thereby necessitating lengthy seasoning until evaporation of the low boiling solvents from the plastic masses is complete. We obtain the desired intimate mixing as well as the grinding of the cellulose ester by employing, for example a "pebble" mill in which the pebbles are of graded flint stones and the mill walls composed of hard porcelain. The ratio of pebbles to cellulose ester for this fine grinding is regulated at 10 parts by weight of pebbles to 1 part by weight of cellulose ester.

The degree of fineness is important. We have found that if the ester or ether is ground until approximately 80% passes an 80 or 100 mesh sieve or to even a finer state of subdivision, excellent results follow. An ester can be obtained in this condition by 6 to 8 hours, more or less, grinding in a mill and under the conditions above specified. The plastifiers and/or softeners are then added and after a further grinding for a period of say five to eight hours grinding, are found to be thoroughly and uniformly incorporated in the cellulose ester mass. Materials for effect such as dyestuffs, pigments, gums, fillers and/or other effect materials can then be added, and after a further grinding for a period of five to eight hours, the mixture is found to be a uniform material ready to be molded or otherwise formed into desired articles of manufacture. Or in some cases the cellulose ester, plastifier and filling materials may all be added and ground in one operation.

The following are examples of the manner in which our invention may be carried out.

Example I 80 lbs. of cellulose acetate of an average fineness of 6 to 8 mesh are put into a pebble mill with about 800 lbs. of 1½ to 2 inch flint stones and ground for 6 to 8 hours, more or less. At the end of such grinding it will be found that about 80% of the acetate passes an 80 mesh sieve. To this ground mass of cellulose acetate in the mill are added 24 lbs. of triacetin and 4 lbs. of diethyl phthalate and the mill run for a further period of 8 hours. After this final grinding and mixing, or until the mass is quite homogeneous, the mixture is ready for use as a thermoplastic composition where color and opaqueness are not desired.

Example II 100 lbs. of cellulose acetate of an average fineness of say, 100 mesh are placed in a pebble mill with about 800 lbs. of 1½ to 2 inch flint stones or steel balls and ground to such a degree of fineness that 100% of the acetate passes an 80 mesh sieve while about 90% of the acetate passes a 100 mesh sieve. This may require about 8 to 10 hours. To this ground mass are added 20 lbs. of ethyl paratoluene sulfonamid and 10 lbs. of triphenyl phosphate and the grinding continued until the mass is quite homogeneous. The mixture is then ready for use in this invention.

Example III 80 lbs. of cellulose butyrate of average fineness of 6 to 8 mesh are put into a pebble mill such as used in Example I and ground for 6 to 8 hours. At the end of this grinding about 80% of the butyrate will pass an 80 mesh sieve. 10 lbs. of triacetin, 10 lbs. of diethyl phthalate and 5 lbs. of tricresylphosphate are now introduced into the mill containing the finely ground butyrate and the mixture ground for an additional 8 hours. A uniform thermoplastic powder suitable for use where color and opaqueness are not desired, is obtained.

Example IV 80 lbs. of cellulose ethyl ether of an average fineness of 20 mesh are introduced into a pebble mill as set out in Example I and ground for 6 to 8 hours. This grinding converts the ether into a powder capable of passing a 100 mesh sieve. To this finely ground ether in the mill are added 20 lbs. of dibutyl phthalate and the grind continued for a further period until properly mixed. A uniform thermoplastic powder results from the above process and the powder can be used where color and opaqueness are not desired.

Where colored and opaque plastic compositions are desired, various dyestuffs, pigments or effect material can be added. Thus if a white thermoplastic composition is wanted, 50 to 100 lbs. for instance 75 lbs. of zinc oxide can be added to the thermoplastic powder of the above examples and the mixture ground for a further period until homogeneously mixed.

Instead of partly grinding the cellulose derivative prior to the addition of the plastifier and/or the effect material, all the ingredients may be added at once to the mill, and the whole ground and mixed together for the period required to obtain the desired degree of fineness and admixture. The degree of fineness to which the powder is ground may be varied to meet any particular requirements. We have found that if it passes a sieve of a mesh of 100, more or less, desirable results are attained. In this connection, it may be pointed out that the finer the degree of subdivision of the powder, the greater the strength and clarity of the resulting pressed plastic composition. It is therefore advantageous to grind the powder as finely as possible.

The powder containing the intimate mixture of finely divided organic derivatives of cellulose and plastifier, either with or without filling material, pigments and/or effect material, made as above or in any other suitable manner, is applied as a layer between the surfaces to be united. The quantity of the powder used may be varied at will to produce final joints of any desired thickness and strength, varying from very thin layers that are hardly perceptible, to quite thick layers or joints where the strength and beauty of the plastic composition are particularly desired.

The articles or sheets with the layer of powder containing the organic derivatives of cellulose may then be placed in a press or between calenders, where they are pressed under heat and pressure. Obviously any other suitable means may be used for applying the heat and pressure.

While we do not limit ourselves to any specific temperatures or pressures, we have found that temperatures of from about 50° to about 80° C. and preferably 70° C. and pressures of from about 300 lbs. to about 500 lbs. per square inch, say 400 lbs. per square inch, give highly satisfactory results. After consolidation of the powder into a homogeneous and continuous layer between the surfaces of the articles or sheets being united, which require but a short time, the material is chilled and ready for use. The temperature, pressure and time required for the operation varies in accordance with the amount and nature of the plastifier used, the more plastifier used, the lower the temperature and/or pressure required.

Since no volatile solvent is used, the articles or sheets may be used at once. The layer formed from the powder containing organic derivatives of cellulose is tough and strong and in most cases is stronger than the material or the articles joined together. When transparent material, such as glass, is to be joined together by our invention, the color of the plastic composition may be of importance. If no pigment or dye is added to the powder, the resulting product is clear and transparent. On the other hand, various colors may be imparted thereto by the addition of pigments and/or dyestuffs. Vari-colored patterns may be obtained by adding dyestuffs or pigments of various colors to all or portions of the powder mixture prior to pressing the same, in such a manner as to produce the desired pattern.

The powder containing the organic derivatives of cellulose and plastifier may be applied in any suitable manner. Often it is desired to cause the powder to adhere to the surface that is to be joined, by an agglutinate such as gum, or by any other suitable means or in any other suitable manner, prior to pressing, in order to prevent its falling off the surface. For producing thin layers the plastic composition may be merely powdered onto the surface.

The articles to be united by the method of this invention may be of any desired shape or form and may be made of any desired pattern. Thus the articles to be joined may be in the form of sheets, plates, slabs, blocks, rods, bricks or of any of the complicated shapes of finished articles of any size. The articles to be joined may be made of wood, metal, stone, brick, ceramic material, synthetic resins of the phenol-aldehyde type, glass, cardboard, paper, leather or fabrics of all kinds such as cotton, silk, wool, etc.

The applications of this invention are so numerous that only a few of the many specific instances can be here given. An interesting use of this invention is for the making of laminated glass. Laminated glass held together by sheets containing cellulose derivatives is in wide demand, because, when broken, it does not shatter. Such shatterless glass may be made in accordance with our invention. This may be done by placing one or more layers of powder containing the organic derivatives of cellulose between two or more sheets of glass and pressing as described above. Often it is desirable to add small quantities of a dyestuff, usually of a blue or violet color, to impart a corrective color to the resulting layer of plastic composition. Instead of using the powder alone as the source of the cellulose derivative, the shatterless glass may be made by the use of pre-formed sheets containing derivatives of cellulose such as cellulose nitrate, cellulose acetate, etc. The sheets may be made in any known or suitable manner. The sheets containing the cellulose derivatives are placed between the sheets of glass and the whole united by means of a powder containing the organic derivatives of cellulose, which is placed between the surfaces and pressed in accordance with our invention.

The making of laminated materials of all kinds is greatly facilitated by our process. The making of ply-wood by our process, especially for aeroplane propellers or the like, produces a product of great strength. Another use of our invention is for applying wood veneer, such use producing a strong union.

For the uniting of smooth surfaces made of material such as metal, glass or phenol-aldehyde resins, it is sometimes advisable to use special expedients to cause the layer of plastic composition to be retained to the surfaces to be united. Thus if glass or metal sheets or other articles are to be joined, it is well to make holes in the surface thereof. The axes of these holes should preferably not be at right angles to the surface of the article, in order to produce a better locking effect. The holes may also be screw-threaded. Instead of holes, the surfaces may have therein recesses or grooves of increasing cross section so as to form undercut portions for the plastic material to lock the same onto the surfaces. When these holes, grooves or recesses are made in such material as glass or steel or resins of the phenol-aldehyde type, economies are effected by making these while the materials are still soft and before they harden.

As stated before, any materials such as filling material or effect material may be added to the organic derivative of cellulose and plastifier to produce desirable effects. The pigments used in the paint industry may be added to the powder mass to impart any desired color.

It is to be understood that the above detailed description is given merely by way of illustration. As examples of organic derivatives of cellulose, organic esters of cellulose or cellulose ethers may be given. Examples of organic esters of cellulose are cellulose acetate, cellulose formate, cellulose propionate and cellulose butyrate, while examples of organic ethers of cellulose are methyl cellulose, ethyl cellulose and benzyl cellulose.

As a result of our invention it is possible to produce joints of great strength of plastic compositions containing organic derivatives of cellulose without the use of volatile solvents. By this means, not only is the cost of solvents saved, but the fire risk and unpleasant odors attending therewith are obviated. The time required for the drying of the solvents is entirely saved, and joints of great strength are produced.

The term plastifier denotes a substance of high or relatively high boiling point which is fixed or retained in the plastic mass after manufacture and which imparts plasticity to the cellulose derivative and as used in the appended claims is intended to include camphor substitutes, high boiling solvents, softeners or gelatinizing agents or mixtures of these. Most probably the plastifier is present in the mass in the form of a solute, i. e. dissolved in the cellulose derivative.

It is to be understood that the foregoing detailed description is given merely by way of illustration and that many variations may be made therein without departing from the spirit of this invention.

Having described our invention, what we claim and desire to secure by Letters Patent is:

1. Method of uniting surfaces made of material that does not soften or melt during the subsequent pressing operation comprising applying a mass of powder containing finely divided organic derivatives of cellulose and a plastifier between said surfaces and pressing to form an adherent union between said surfaces.

2. Method of uniting surfaces made of material that does not soften or melt during the subsequent pressing operation comprising applying a mass of powder containing finely divided cellulose acetate and a plastifier between said surfaces and pressing to form an adherent union between said surfaces.

3. Method of uniting surfaces made of material that does not soften or melt during the subsequent pressing operation comprising applying a mass of powder containing finely divided cellulose acetate and a plastifier between said surfaces and pressing at elevated temperatures to form an adherent union between said surfaces.

4. Method of uniting surfaces made of material that does not soften or melt during the subsequent pressing operation comprising finely pulverizing an organic derivative of cellulose, mixing a plastifier therewith, grinding intimately mixing the mixture of organic derivative of cellulose and plastifier until a homogeneous powder is formed, applying a quantity of such powder between the surfaces and pressing at elevated temperature to form an adherent union between said surfaces.

5. Method of uniting surfaces made of material that does not soften or melt during the subsequent pressing operation comprising finely pulverizing cellulose acetate, mixing a plastifier therewith, grinding and intimately mixing the mixture of cellulose acetate and plastifier until a homogeneous powder is formed, applying a quantity of such powder between the surface and pressing at elevated temperature to form an adherent union between said surfaces.

6. Method of uniting surfaces made of material that does not soften or melt during the subsequent pressing operation comprising pressing a mass of powder containing a finely divided organic derivative of cellulose and a plastifier between the surfaces at a pressure of substantially 300 to 500 lbs. per square inch and at a temperature of substantially 50° to 80° C. to form an adherent union between said surfaces.

7. Method of uniting surfaces made of material that does not soften or melt during the subsequent pressing operation comprising pressing a mass of powder containing a finely divided cellulose acetate and a plastifier between the surfaces at a pressure of substantially 300 to 500 lbs. per square inch and at a temperature of substantially 50° to 80° C. to form an adherent union between said surfaces.

8. Method of uniting surfaces made of material that does not soften or melt during the subsequent pressing operation comprising interrupting the continuity of said surfaces and applying a mass of powder containing finely divided organic derivatives of cellulose and a plastifier between said surfaces under pressure and at elevated temperature to form an adherent union between said surfaces.

9. Method of uniting surfaces made of material that does not soften or melt during the subsequent pressing operation comprising interrupting the continuity of said surface and applying a mass of powder containing finely divided cellulose acetate and a plastifier between said surfaces under pressure and at elevated temperature to form an adherent union between said surfaces.

10. Method of uniting articles comprising making openings in the surfaces made of material that does not soften or melt during the subsequent pressing operation of the articles and compressing a homogeneous powder containing finely divided organic derivatives of cellulose and a plastifier at elevated temperature into the openings and between the surfaces of the articles whereby a continuous layer of plastic composition is formed which layer is locked onto the surfaces of the articles and an adherent union is formed between said surfaces.

11. Method of uniting articles comprising making openings in the surfaces made of material that does not soften or melt during the subsequent pressing operation of the articles and compressing a homogeneous powder containing finely divided cellulose acetate and a plastifier at elevated temperature into the openings and between the surfaces of the articles whereby a continuous layer of plastic composition is formed which layer is locked onto the surfaces of the articles and an adherent union is formed between said surfaces.

12. Method of forming laminated glass comprising applying a mass of powder containing organic derivatives of cellulose and a plastifier between the surfaces or sheets of glass and pressing.

13. Method of forming laminated glass comprising applying a mass of powder containing cellulose acetate and a plastifier between the surfaces or sheets of glass and pressing.

14. Method of forming laminated glass comprising applying a mass of powder containing cellulose acetate and a plastifier between the surfaces or sheets of glass and pressing at elevated temperature.

15. An article having a layer of plastic composition therein, which plastic composition forms an adherent union between the surfaces of the other parts of the article, which surfaces are made of material that does not soften or melt during the pressing operation, said plastic composition containing organic derivatives of cellulose uniformly distributed therethru and a plastifier and being free of volatile solvents.

16. An article having a layer of plastic composition therein, which plastic composition forms an adherent union between the surfaces of the other parts of the article, which surfaces are made of material that does not soften or melt during the pressing operation, said plastic composition containing cellulose acetate uniformly distributed therethru and a plastifier and being free of volatile solvents.

17. An article having a layer of plastic composition therein, which plastic composition forms an adherent union between the surfaces of the other parts of the article, which surfaces are made of material that does not soften or melt during the pressing operation and forms a locking means for the other parts, said plastic composition containing organic derivatives of cellulose.

18. A laminated material having a layer of plastic composition therein, which plastic composition forms an adherent union between the sheets of the laminated material, said plastic composition containing organic derivatives of cellulose and a plastifier and being free of volatile solvents.

19. A laminated material having a layer of plastic composition therein, which plastic composition forms an adherent union between the sheets of the laminated material, said plastic composition containing cellulose acetate and a plastifier and being free of volatile solvents.

20. A laminated glass having a layer of plastic composition therein, which plastic composition unites the sheets of the glass, said plastic composition containing organic derivatives of cellulose and a plastifier and being free of volatile solvents.

21. A laminated glass having a layer of plastic composition therein, which plastic composition unites the sheets of the glass, said plastic composition containing cellulose acetate and a plastifier and being free of volatile solvents.

In testimony whereof, we have hereunto subscribed our names.

CAMILLE DREYFUS.
GEO. SCHNEIDER.